United States Patent [19]

Brücher et al.

[11] Patent Number: 4,478,451
[45] Date of Patent: Oct. 23, 1984

[54] MECHANICALLY OPERATED TONGS FOR GRIPPING ROUND OBJECTS

[75] Inventors: Eberhard Brücher; Karl-Heinz Schüssler, both of Siegen, Fed. Rep. of Germany

[73] Assignee: Dango & Dienenthal Maschinenbau GmbH, Siegen, Fed. Rep. of Germany

[21] Appl. No.: 345,342

[22] Filed: Feb. 3, 1982

[30] Foreign Application Priority Data

Jun. 16, 1981 [DE] Fed. Rep. of Germany ....... 3123897

[51] Int. Cl.$^3$ .......................... B25J 15/00; B66C 1/42
[52] U.S. Cl. ................... 294/106; 294/86 R; 294/DIG. 2
[58] Field of Search ............... 294/16, 28, 33, 88, 294/86 R, 99 R, 100, 106, 113, 118, DIG. 2; 81/425 R, 425 A, 426; 269/265, 266, 268–270, 902

[56] References Cited

U.S. PATENT DOCUMENTS 2,665,162  1/1954  Moore et al. .................. 294/16
3,521,923  7/1970  Noel .......................... 294/99 R X
3,697,115 10/1972  La Beck ....................... 294/106 X

FOREIGN PATENT DOCUMENTS 966264 10/1950 France ................. 294/106

Primary Examiner—Johnny D. Cherry
Attorney, Agent, or Firm—Young & Thompson

[57] ABSTRACT

Mechanically operated tongs for gripping round objects comprise a pair of uniformly swivelable tong arms the forward ends of which have gripping surfaces adapted to engage the round objects. The gripping surfaces of each tong are comprised by two surfaces disposed at an obtuse angle to each other. The surface farthest from the pivot point of the tong is concave and the surface closest to the pivot point of the tong is convex, with such a configuration that the distance from a line interconnecting the contact points of the two concave surfaces to the center of the round object is substantially equal to the distance from the center of the object to a line interconnecting the contact points of the two convex surfaces, over a wide range of different diameters of round objects. The convex and concave surfaces can be smoothly curved or else comprised of a plurality of short linear portions. In this way, what would otherwise be the centering error of tongs whose pivot points are fixed, when used to grip round objects of various diameters, is overcome.

2 Claims, 3 Drawing Figures

MECHANICALLY OPERATED TONGS FOR GRIPPING ROUND OBJECTS

The invention relates to mechanically operated tongs for gripping round objects, with uniformly swivelable tong arms, the front ends of which, for gripping round objects of varying diameters, exhibit respectively two engaging surfaces forming an obtuse angle.

Conventional tongs of this type for gripping round objects, such as blocks, rings, or disks, frequently exhibit movable tong jaws on the front ends of the tong arms. These tong jaws can adjust to varying diameters of the round objects to be gripped, on account of their pivotable bearing.

Centering is impossible in this way, i.e. the axis of a round object of small cross section, with the position of the tongs or the machine carrying same remaining the same, will be displaced with respect to the axis of a round object of a larger diameter. This centering error can be avoided in tongs having parallel-guided tong arms, but such parallel guide means are complicated, trouble-prone, and also frequently require more operating room than is available. Lever-type tongs with tong arms pivotable about vertical axes require less manipulating room and are more rugged, which has a beneficial effect especially if the tongs are used for introducing and removing round objects into and out of annealing furnaces, presses, drop forging hammers, or rolling mills.

The centered gripping of round objects is important particularly in automatic installations for the working of round workpieces, for example in an installation for the rolling of rings, consisting of furnace, press, and rolling mill, a stationary machine being provided for operating the tongs.

The invention is based on the objective of constructing a pair of tongs of the type described hereinabove in such a way that it affords not only an automatic adaptation to varying diameters of the round objects to be seized, but also makes centered gripping of these objects possible.

This objective has been attained according to the invention by imparting a curve-like configuration to the engaging surfaces of the tong arms in order to compensate for the centering error.

In a further development of the invention, the engaging surface located farthest from the swivel axis of each tong arm is curved in a concave fashion while the engaging surface lying closest to the swivel axis extends in a convex fashion.

The configuration of the engaging surfaces can be in the form of harmonic curves. The engaging surfaces, however, can also be composed of a plurality of linear individual areas. This can be sufficient for centering within a given tolerance.

Suitably, the position and curvature of the engaging surfaces are determined in dependence on the length of the tong arms and on the position of the swivel axes thereof.

The curved engaging surfaces are advantageously provided on exchangeable tong jaws.

The special advantage achieved by the invention is to be seen in that it is possible, for the centered gripping of round workpieces and thus for the exact positioning thereof even if they change their diameter within a working installation with several working stages, to utilize the rugged tongs having swivelable tong arms and requiring only a small manipulating room, which also simplifies the automation of such a working installation.

The problem on which this invention is based, as well as an embodiment of the invention are illustrated in the drawings wherein.

Figure 1:
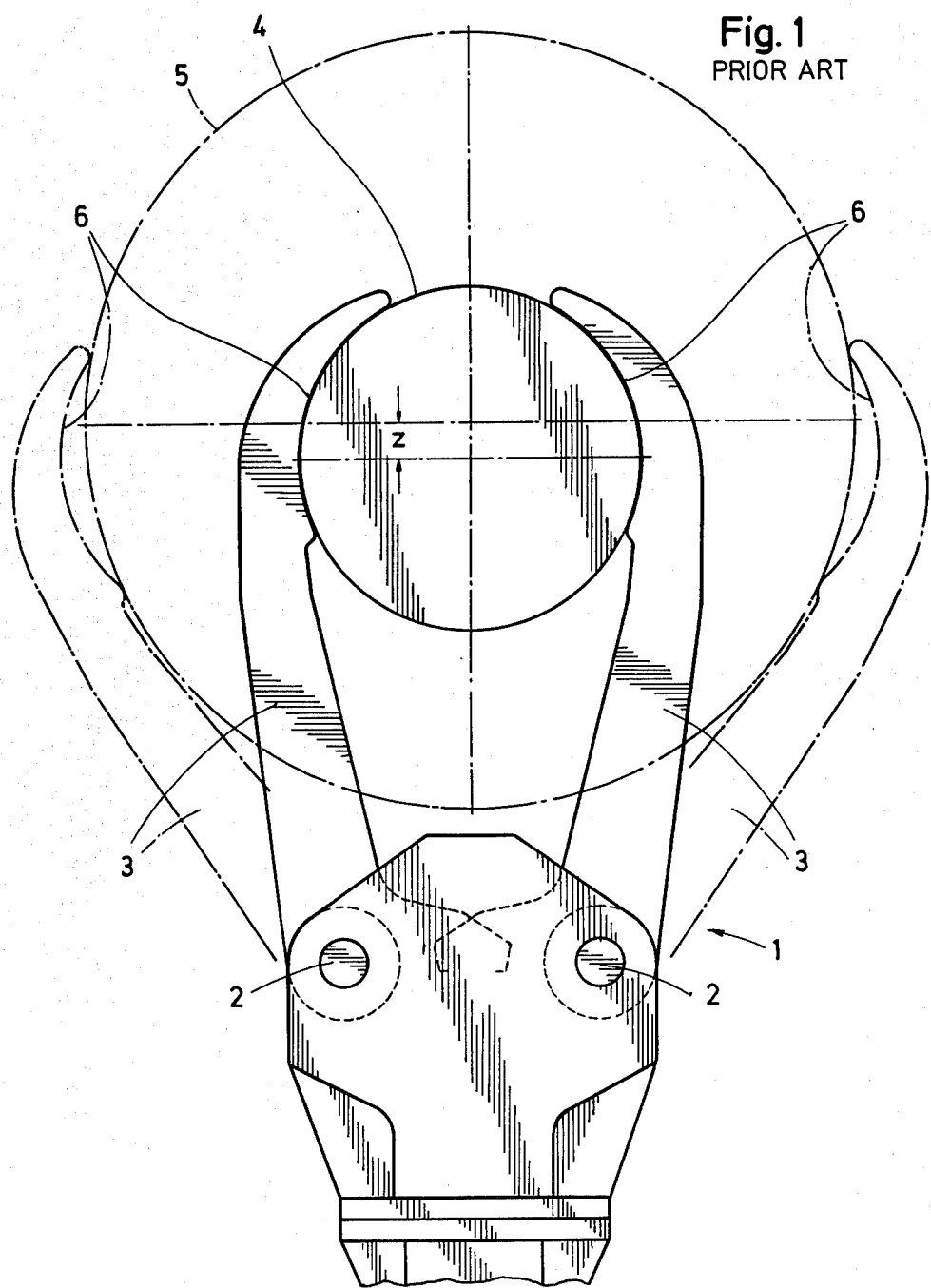
FIG. 1 shows a conventional pair of tongs with pivotable tong arms in a top view to explain the centering error.

It can be seen from FIG. 1 that a centering error Z occurs in conventional tongs 1 having tong arms 3 swivelable about vertical axes 2, when round objects 4, 5 are seized having varying diameters. This centering error Z also occurs in tongs wherein prismatic tong jaws are provided at the front ends of the tong arms 3, rather than round engaging surfaces 6 as in the illustrated example, even if such prismatic tong jaws are, in turn, pivotably supported at the tong arms 3.

Figure 2:
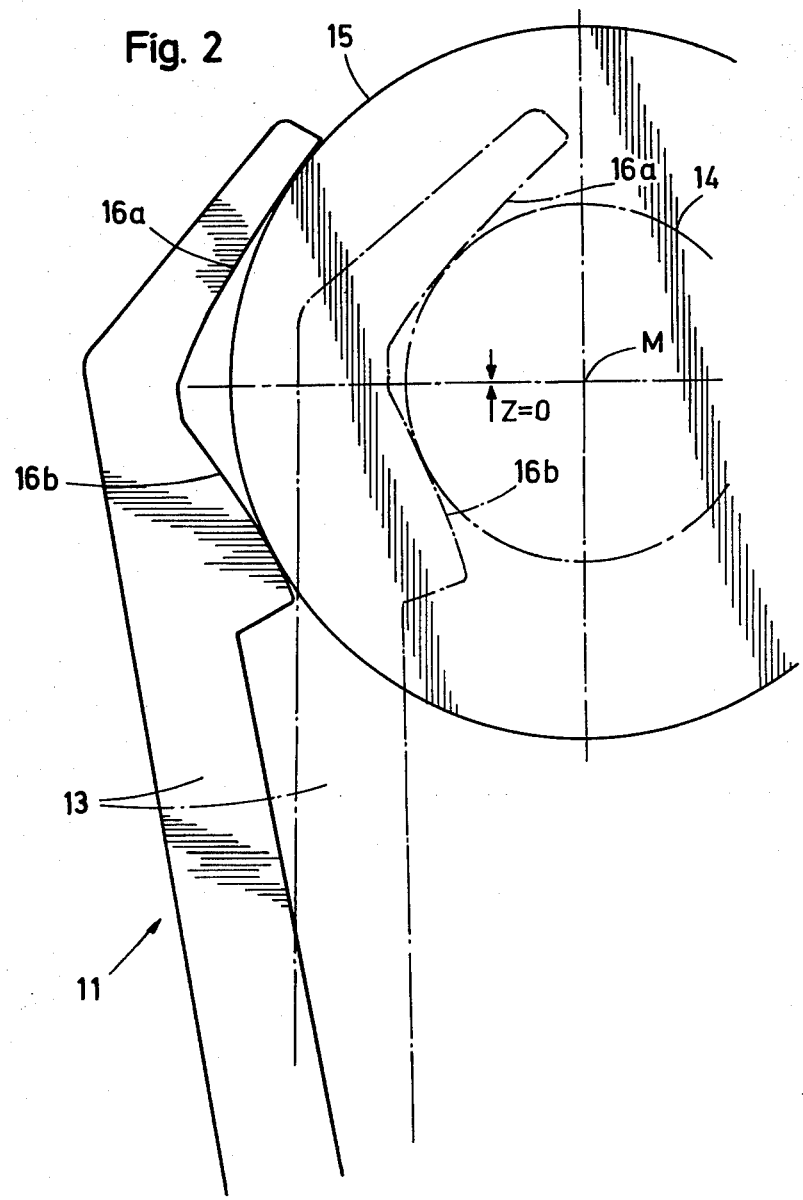
FIG. 2 is a schematic top view of one half of a pair of tongs according to this invention.
Figure 3:
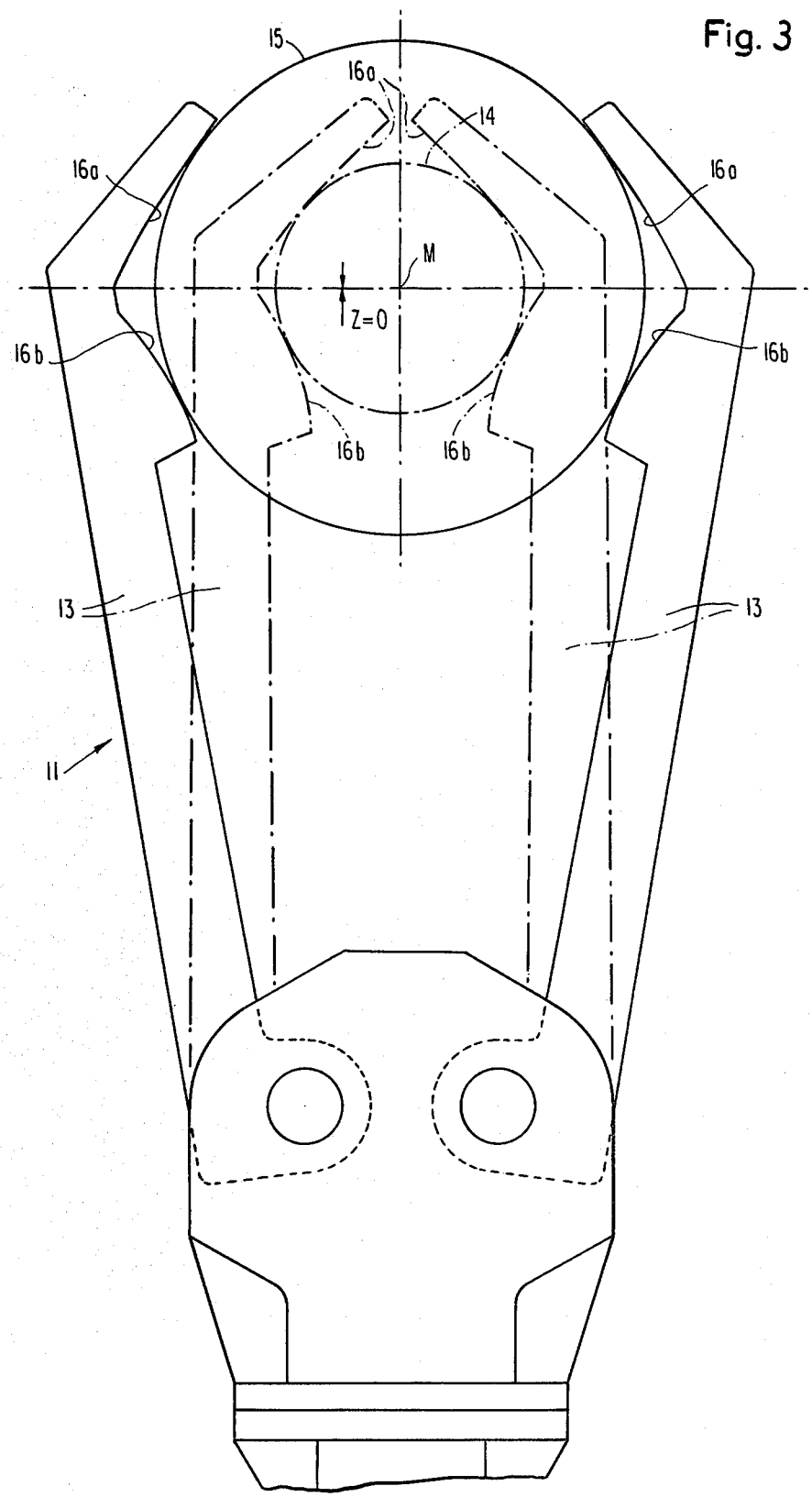
FIG. 3 is a view similar to FIG. 1 but showing the present invention.

In FIGS. 2 and 3, the same reference numerals as in FIG. 1, increased by 10, are utilized for identical components, wherein FIG. 2 shows only one-half of a pair of tongs according to this invention in a purely schematic top view; whilst FIG. 3 shows the full view as in FIG. 1. It can be seen that the center M of all round objects 14, 15 remains in a constant position if the engaging surfaces 16a, 16b on the front ends of the tong arms 13 are imparted with such a configuration that the centering error Z (FIG. 1) is compensated for in case of all diameters of the round objects 14, 15 within a specific, but relatively large range.

For this purpose, the engaging surface 16a is of a slightly concave configuration, while the engaging surface 16b which is closer to the swivel point of the tong arm 13, not shown in FIG. 2, is of a correspondingly convex configuration. Of course, the curved shape of the engaging surfaces 16a, 16b is adapted to the lever arm length of the tong arms 13 and to the position of the respective swivel axis of the latter.

Since minor centering errors of a few millimeters can be tolerated in most cases, there is also the possibility of composing the curved engaging surfaces 16a, 16b of several linear individual areas. The engaging surfaces 16a, 16b can furthermore be arranged on exchangeable tong jaws.

What is claimed is:

1. Mechanically operated tongs for gripping round objects, comprising a pair of tong arms, means mounting each tong arm for pivotal movement toward and away from the other tong arm about a pivot point, the ends of the tong arms having each two engaging surfaces forming an obtuse angle with each other, the engaging surface farthest from the pivot point of each tong arm being concave and the engaging surface lying closest to the pivot point of each tong arm being convex, said surfaces being so configured that a line extending between the points of contact of said concave surfaces will be spaced from the center of said round object substantially the same distance as a line interconnecting the points of contact of said convex surfaces with the same round object for any of a plurality of different diameters of round objects whose axes are all disposed at the same distance from the pivot point of each tong arm.

2. Tongs as claimed in claim 1, in which each said surface comprises a smooth curve.

* * * * *